Aug. 30, 1932.　　　　G. L. SMITH　　　　1,874,821
BRAKE MECHANISM
Filed Feb. 5, 1931
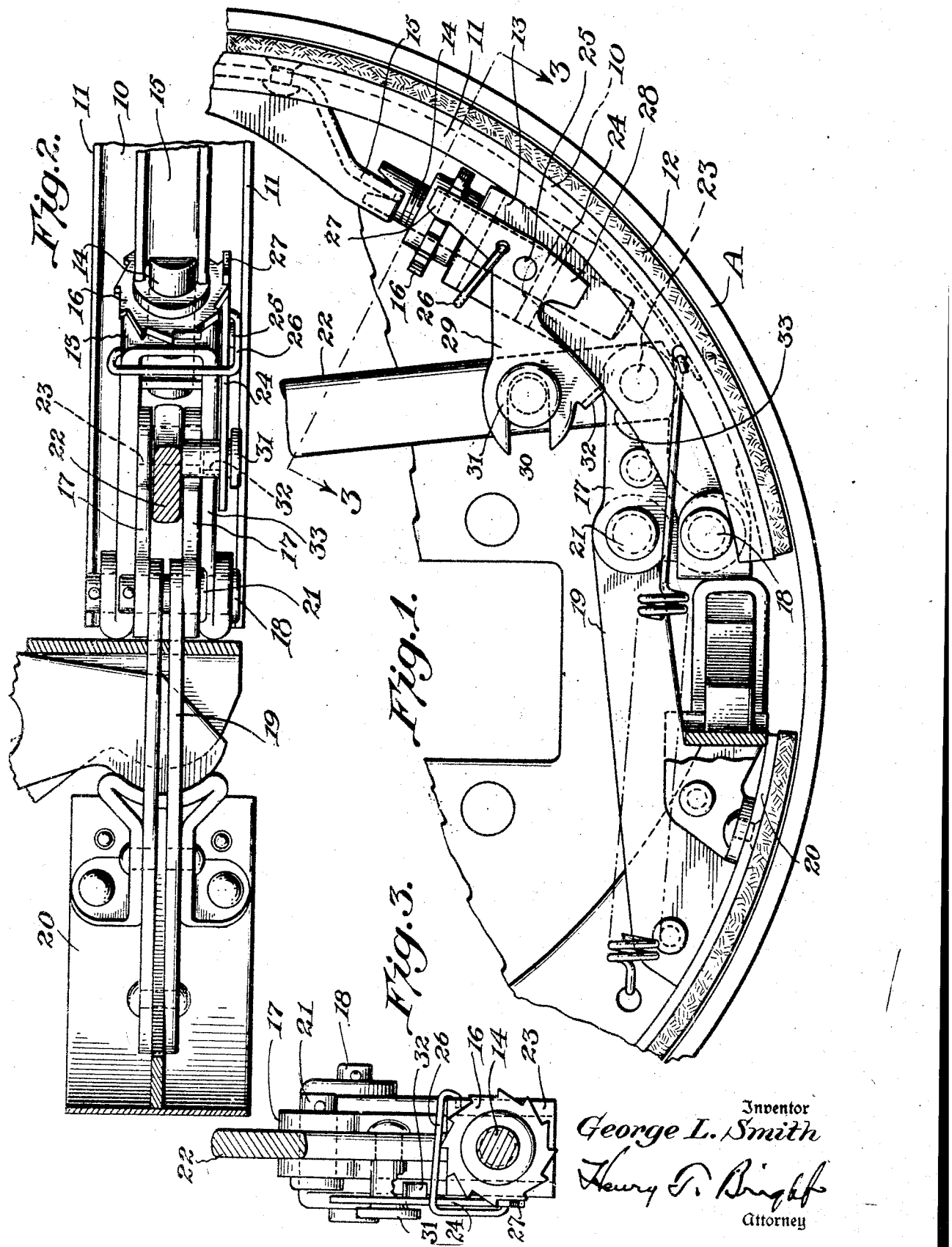
Inventor
George L. Smith
Henry T. Bright
Attorney Patented Aug. 30, 1932

1,874,821

UNITED STATES PATENT OFFICE

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA

BRAKE MECHANISM

Application filed February 5, 1931. Serial No. 513,693.

My invention relates to automotive brake mechanisms and particularly to the type of mechanism described and claimed in my copending applications Nos. 362,534 and 419,902.

It is the purpose of my present invention to provide a non-varying and simple means for adjusting the various parts of brake mechanisms of the general type disclosed in my aforesaid applications.

In the drawing chosen to illustrate my invention

Figure 1 is a partial side elevation of a brake having my invention incorporated, the brake being shown released;

Figure 2, a plan view of Figure 1 showing the brake released; and

Figure 3, a section on the line 3—3 of Figure 1.

In the drawing I have shown my invention incorporated in an internal expanding brake embodying a drum A within which is a full wrap expanding braking member 10 having side flanges 11 extending inwardly and having mounted thereon the usual lining 12 for braking engagement with the drum.

An extension device or slack adjuster is embodied in the mechanism and is shown as located between the flanges 11 and comprises a body 13 which is in contact with and extensible along the inner face of the braking member. An adjusting screw 14 is carried by the body 13 and abuts against a stop 15 riveted to the inner face of the braking member as shown. A ratchet 16 is threaded to the screw 14 and acts as a stop which bears against the top of the body 13. A brake lever 17 is pivoted to the body 13 by the pin 18. An arm or extension 19 is fixed to the end 20 of the braking member and the lever 17 is pivoted to this arm by a pin 21, so that said arm 19 cross-connects the two ends of the braking member through the body 13, screw 14 and stop 15 all as previously described in my aforesaid copending applications.

An operating link 22 is pivoted at 23 to the free end of the lever 17, so that an upward pull on link 22 will raise the free end of the lever 17 and swing pivot 18 to the right with respect to pivot 21 and thus expand the band and apply the brake.

On the body 13 I pivot a ratchet lever 24 by means of a pin 25 riveted to the body 13. A spring 26 holds this ratchet lever in place and the end 27 thereof against the teeth of ratchet 16. The portion 28 of the ratchet lever bears against the side of the body 13. An extension 29 is provided on the ratchet lever and this extension terminates at its free end in a jaw 30 for receiving an operating stud 31 riveted to link 22.

The general operation of my slack adjuster is fully described in my aforesaid copending applications, but such operation is pointed out briefly as follows: During application and release of the brake the link 22 is reciprocated and the ratchet lever 24 in turn oscillated. Under normal conditions this oscillation of the ratchet lever will be without effect on ratchet 16. When a predetermined amount of wear of the lining 12 occurs, the extent of the brake applying movement of the link 22 will increase sufficiently to cause the ratchet lever to pick up the next tooth of ratchet and upon subsequent release of the brake the ratchet 16 will be rotated to extend the slack adjuster and restore the proper relation between all parts of the mechanism.

The extension 29 also carries a turned over flange 32 which is adapted to bear upon the upper edge 33 of the body 13 and acts as a stop fixing the position of the various parts as follows:

With the flange 32 bearing against the edge 33:— a. Stud 31 bears against the lower side of jaw 30 and limits downward movement of link 22 thus fixing the brake "off" position of said link, and thereby also fixing the brake "off" position of pin 23 and the length of the gap between the ends of the braking member 10.

b. The brake "off" position of the ratchet lever 24 is also fixed and in turn the brake "off" position of the ratchet 16 is fixed.

All these brake "off" positions of the various parts are important to the proper adjustment of a set of automotive brakes, four for example, operated by a single pedal or lever, as is now conventional with automobile brakes, since it is self-evident that the effects of the pedal movement on the several brakes must be uniform. It is also evident that the ratchet lever is held in a fixed and invariable position when the brake is off by having the stop 32 held in positive engagement with the edge 33 by the stud 31 pressing down on lower side of jaw 30. Therefore any play of stud 31 in slot 30 has no effect on the position of lever 24.

I claim:

1. In a brake mechanism, a brake operating member, a brake adjusting lever, a relatively fixed part and means carried by said operating member engaging said adjusting lever and holding it against said fixed part when the brake mechanism is in the inoperative position.

2. In a brake mechanism, a brake operating member, a brake adjusting lever carrying a stop, a relatively fixed part and means carried by said operating member engaging said adjusting lever and holding said stop against said fixed part when the brake mechanism is in the inoperative position.

3. In a brake mechanism, a brake operating member, a brake adjusting lever carrying a stop, a relatively fixed part, a pin carried by said operating member and a slot for said pin in said adjusting lever, whereby said member controls the movement of said lever in both directions of motion.

In testimony whereof I hereunto affix my signature.

GEORGE L. SMITH.